(12) United States Patent
Hu et al.

(10) Patent No.: US 11,615,197 B1
(45) Date of Patent: Mar. 28, 2023

(54) SECURE INFORMATION TRANSFER

(71) Applicant: Meta Platforms, Inc., Menlo Park, CA (US)

(72) Inventors: Yue Hu, Irvine, CA (US); Bingxin Zhu, Palo Alto, CA (US); Angel Manuel Pino Dominguez, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 485 days.

(21) Appl. No.: 16/733,142

(22) Filed: Jan. 2, 2020

(51) Int. Cl.
*G06F 21/60* (2013.01)
*G06Q 50/00* (2012.01)
*H04L 9/40* (2022.01)

(52) U.S. Cl.
CPC .......... *G06F 21/606* (2013.01); *G06F 21/602* (2013.01); *G06Q 50/01* (2013.01); *H04L 63/10* (2013.01)

(58) Field of Classification Search
CPC ..... G06F 21/606; G06F 21/602; G06Q 50/01; H04L 63/10
See application file for complete search history.

(56) References Cited

U.S. PATENT DOCUMENTS

| | | | | |
|---|---|---|---|---|
| 7,359,894 B1 * | 4/2008 | Liebman | ............ | G06Q 10/107 707/999.102 |
| 2005/0283619 A1 * | 12/2005 | Min | ............ | H04L 63/0838 713/182 |
| 2007/0129056 A1 * | 6/2007 | Cheng | ............ | H04L 51/12 455/418 |
| 2018/0089461 A1 * | 3/2018 | Williams | ............ | G06Q 20/3829 |

FOREIGN PATENT DOCUMENTS

WO    WO-0133831 A2 *    5/2001    ............ G06Q 30/02

OTHER PUBLICATIONS

Robinson, Marcus, How Stackchat keeps Personally Identifiable Information private on Facebook Messenger, Aug. 8, 2019 (Year: 2019).*

Forsey, Caroline, The Ultimate Guide to Google Forms, Dec. 6, 2018 (Year: 2018).*

* cited by examiner

*Primary Examiner* — Shin-Hon (Eric) Chen
*Assistant Examiner* — Ethan V Vo
(74) *Attorney, Agent, or Firm* — Lee & Hayes, P.C.

(57) ABSTRACT

Techniques are described for providing secure and direct communication between two parties. In some examples, a business server (e.g., a first party), may send a request to a social networking system. The request may include an identifier associated with an end user (e.g., a second party) and an indication of one or more types of information to be requested from the user. In some examples, the user may submit user information to the business server. The user information may include sensitive and/or personal information of the user. The user information may be input by the user into an application associated with the social networking system. The user information may be sent securely and directly from the application on the user's device to the business server and is not accessible by the social networking system.

17 Claims, 7 Drawing Sheets

FIG. 2A

Business-A

To continue, you'll need to verify your account in a short survey. It should just take a couple of minutes.

The information you provide will only be sent to Business-A. Application and Social Network will not see or collect this information.

Verify Your Account
Private between you and Business-A

[ Begin Survey ]

Message...

FIG. 2B

🔒 Account Verification

This Form Will be Encrypted

This form will be encrypted so the information you submit can only be seen by you and Business-A. Application and Social Network won't have access to this information.

Learn More

🔒 Account Verification

Business-A

The information you provide will only be sent to Business-A. Application and Social Network will not see or collect this information.

Learn More

Name
Type full name...

Date of Birth
MM / DD / YYYY

Phone Number
Mobile

[ Next ]

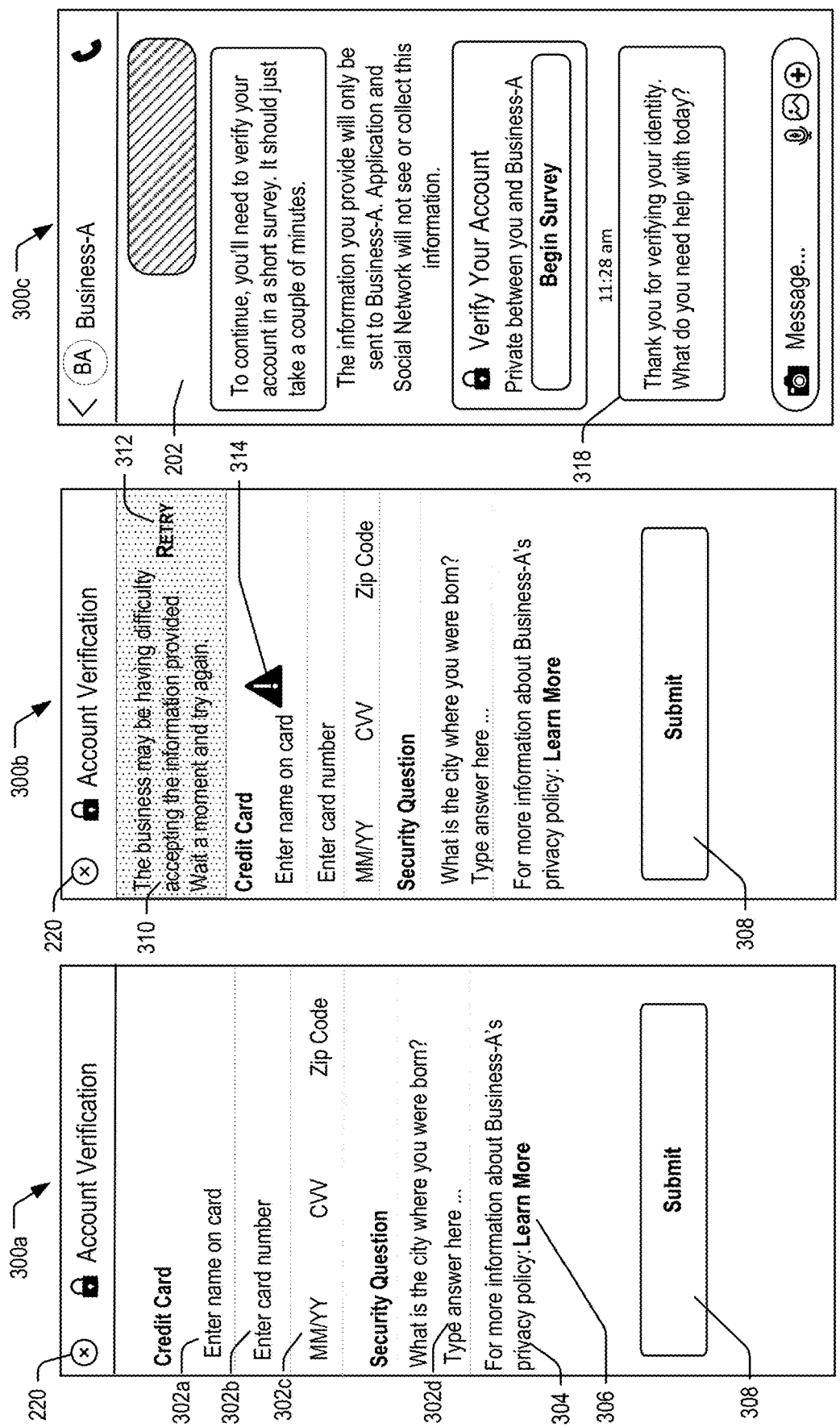

SECURE INFORMATION TRANSFER

BACKGROUND

Digital platforms such as text messaging, instant messaging, email, social media, gaming, or other applications that enable users to share content provide users with numerous benefits and opportunities. For instance, users and third-party businesses may communicate using a messaging service of a digital platform. Third party businesses may want to conduct transactions and/or other business with users through the messaging service, which often requires collection of Personal Identifiable Information ("PII") from users. However, in order to collect a user's PII data using conventional techniques, the user is often required to submit that information through the messaging service, which may enable the digital platform to access and store PII information of users. Users and third-party businesses may not want the digital platform to access the PII information due to concerns associated with security of the transfer and/or storage of the PII information by the digital platform.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 2A-2C illustrate example interfaces usable to present a notification that is selectable to facilitate direct and secure communication in accordance with some embodiments of the present disclosure.

FIGS. 3A-3C illustrate example interfaces usable to present a notification that is selectable to facilitate direct and secure communication in accordance with some embodiments of the present disclosure.

DETAILED DESCRIPTION

Figure 1:
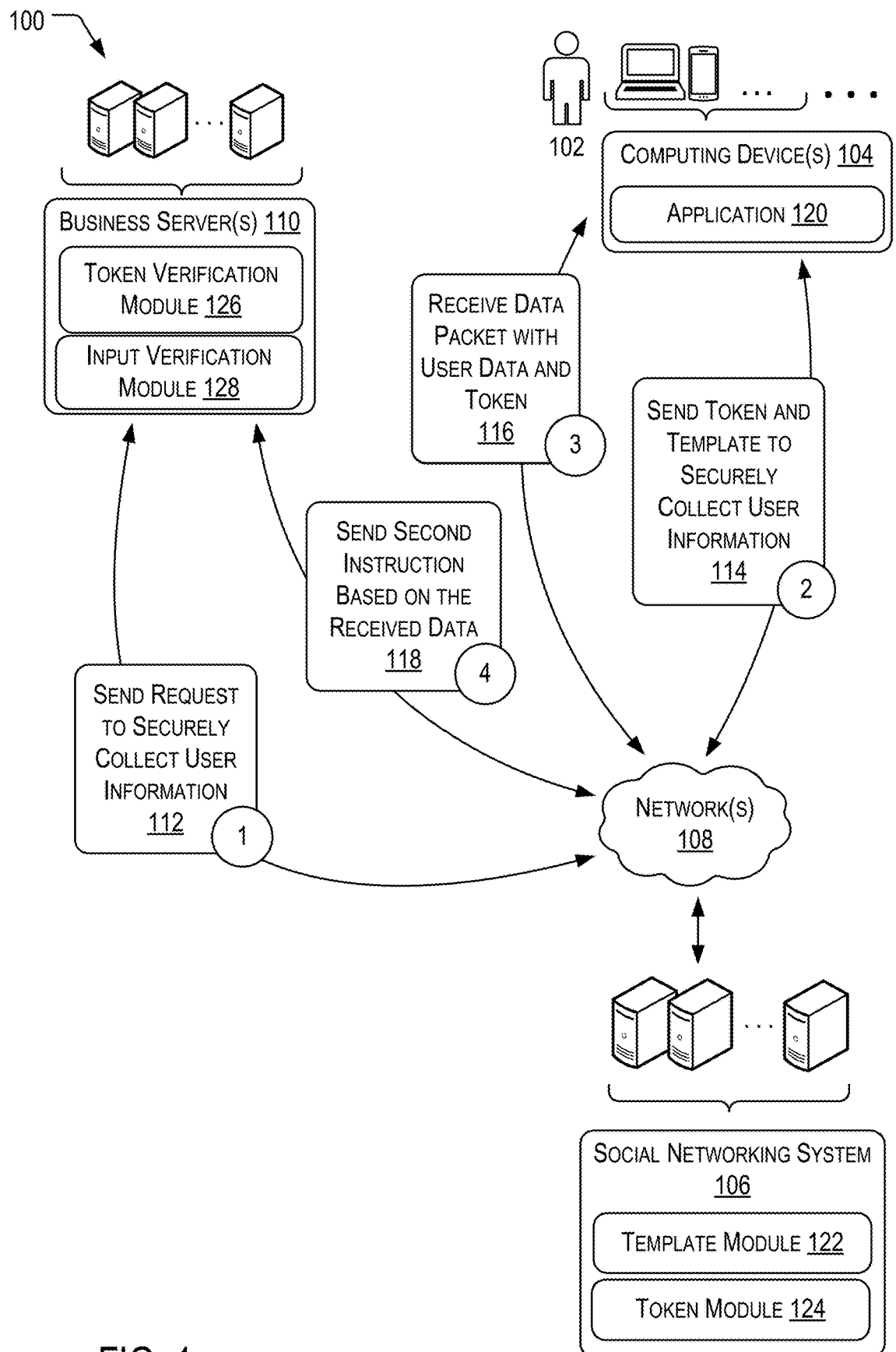
FIG. 1 is a schematic view of an example system usable to implement example secure and direct communication techniques described herein.

As discussed above, previous techniques for communication of information (e.g., "content") between users and third-party businesses via digital platforms can risk information being accessed and/or used by unauthorized parties. For instance, content can take a number of forms (e.g., text, image, video, audio, or a combination of these), and the number of ways to share content is ever growing. As the number of forms of content and number of ways to share content continues to grow, attackers attempting to access user and business information continue to become more sophisticated. For instance, attackers recognize digital platforms as targets for gaining access to Personal Identifiable Information ("PII") of users, such as through messaging services. Therefore, users and third-party business may be hesitant to use a messaging service of a digital platform to share PII with one another.

Additionally, existing techniques of digital platforms often route messages through backend servers of the digital platforms. For example, in a traditional messaging service, messages that are sent in a conversation between parties, whether the messages are encrypted or not, are routed through the backend servers of the digital platform. For example, one of the parties that utilizes the messaging service may be a third-party business, who is communicating with a user of the digital platform through the messaging service. In some cases, the third-party business may need to collect PII of the user. However, existing techniques route the PII of the user through the backend servers of the digital platform. Thus, users and third-party businesses may have concerns regarding what information the digital platform has access to and/or whether the communications being sent via the messaging service are actually secure. Additionally, or alternatively, the user may have privacy and/or other concerns regarding sharing PII via the messaging service. In some cases, the user may refuse to provide PII to the third-party business via the messaging service, which may result in the user being denied access to an account and/or cancellation of a transaction, to name a few examples.

This application describes techniques for facilitating secure and direct communication between multiple parties that utilize a messaging service of a digital platform. In some examples, the techniques described herein may enable a user to utilize a messaging service of a digital platform to submit PII directly to servers of a third-party business, without the message being routed through the backend servers of the digital platform. Therefore, the described techniques enable PII that is submitted by a user to be transferred securely and directly to the third-party business. This ensures that PII of the user is only accessible by the intended recipient, in this case the third-party business. Additionally, the described techniques direct communication of PII between users and third-party businesses that utilize a messaging service of a digital platform, which can reduce and/or eliminate the PII that is ultimately stored by the digital platform. Further, secure communication of the PII between users and third-party businesses may provide greater protection to user identities and may deter attackers, thus reducing negative outcomes.

Consider an example where a bank identifies unusual activity on an account of a user, such as one or more suspicious transactions. In this example, the bank may utilize a messaging service (e.g., a messaging application) provided by a digital platform (e.g., a social networking system) to notify the user of the suspicious activity. Further, the bank may require the user to review and/or approve the suspicious transactions. However, due to the suspicious activity, the bank may require the user to provide additional, sensitive information in order to verify the user's identity. For instance, the user may be required to answer one or more security questions, provide their social security number, provide their date of birth, and so forth before gaining access to their account. In such examples, the bank can send a request to the social networking system indicating it needs to verify the identity of a particular user and collect one or more types sensitive information from the user.

In some examples, the social networking system may provide a message including selectable content (e.g., a link, a button, etc.) to the user via the messaging application. The user may select the content, which initiates a secure connection between the user's device and the bank The secure connection may enable the user to enter answers into one or more fields required to verify their identity and submit (e.g., select "submit", "verify", etc.) in order to send the information directly to the bank via a secure connection, thereby enabling the bank to verify the user's identity. Additionally, the secure connection may be provided within the messaging application (e.g., without the user having to open a browser window or other application), enabling a seamless transition between the secure connection and other activities that the user may be conducting within the messaging application.

In particular, by utilizing the social networking system described herein, the bank in this example is able to provide an extra layer of security for its account holders. For example, when the social networking system receives the bank's request, the social networking system may generate a unique token that is sent to the user with the message. When the user submits their information to the bank via the secure connection, the token may be included with the submission, which can then be used by the bank to verify that the information is coming from the user associated with the account. Further, unlike existing messaging services, where messages sent between two users are routed through backend servers of a digital platform, the described techniques facilitate a direct connection between the user's device and the bank, such that the user's PII is not routed through the backend servers of the social networking system. In this way, the social networking system and the messaging service cannot access and/or store sensitive information the user enters once the connection is initiated. Further, in some examples, the described techniques enable the information (e.g., PII) submitted over the direct connection to be encrypted, thereby providing additional security for the user's sensitive information against potential attackers.

In addition to the advantages identified above, the described techniques may improve performance of one or more computing devices by reducing an amount of content and volume of traffic sent over a network. For instance, by enabling a user to submit PII directly to a third-party business, communications routing the PII through the servers of the digital platform are prevented, thereby reducing the number of communications sent over the network, as well as reducing the quantity of data sent over the network. This may result in faster response and/or processing times from third-party businesses compared to existing techniques, which may delay response of the business due to messages being routed through backend servers. Additionally, conventional techniques that route messages through backend servers may increase the chances of the message being affected (e.g., by network traffic, transport error(s), etc.) due to the additional communications over the network to and from the backend server by both the user and third-party businesses.

Various embodiments of the present disclosure include systems, methods, and non-transitory computer-readable media of a social networking system.

In some examples, the present disclosure describes sending, from a business server and to a social networking system (e.g., a social network server), a request to securely collect information from a user, the request causing the social networking system to generate a token and send, to an application on a computing device, the token and a first instruction for the application to present the request with a representation of a content item. In some examples, the business server receives, from the computing device, the token and user information in response to the request and verifies the token. The business server may, based at least in part on verifying the token, determine whether the user information is verified, and send, from the business server and to the application on the computing device, a second instruction to present a notification corresponding to the user information.

In some examples, the request from the business server comprises at least an identifier associated with the user and an indication of one or more types of information to be collected from the user.

In some examples the request and the user information can be encrypted by a transfer protocol.

In some examples, the representation of the content item presented in the application on the computing device with the request can be associated with a template comprising one or more information fields corresponding to the one or more types of information to be collected from the user, the template enabling direct and secure communication of the user information to the business server.

In some examples, the application on the computing device can comprise at least one of a web browser, a web interface, or a desktop application. In some examples, the template can be hosted as a website with a domain corresponding to the social networking system. In some examples, the application on the computing device may comprise a messaging application associated with the social networking system. In some examples, the template is rendered locally on the computing device.

In some examples, receiving the token and the user information by the business server prevents the user information from being stored locally by the computing device or by the application on the computing device.

In some examples, the business server may determine whether the user information is verified based at least in part on comparing the user information with user data stored in a database of the business server. In some examples, the business server may further generate, based at least in part on the user information being successfully verified, the second instruction to comprise an indication that the user information was verified. In some examples, the business server may further generate, based at least in part on the business server determining that the user information failed to be verified, the second instruction to indicate one or more errors corresponding to the user information input and requesting additional input from the user.

Any or all of the foregoing examples may be implemented alone or in combination with any one or more of the other examples.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while many of the examples are given in the context of an application on a computing device and/or a messaging service of a digital platform, the techniques described herein may also be applied to, without limitation, any context where communications are routed through a backend server.

Example System Architecture

FIG. 1 is a schematic view of an example system 100 usable to implement example techniques described herein to enable secure and direct communication of Personal Identifiable Information ("PII") via the system 100.

In some examples, the system 100 may include a user 102 that may interact using a computing device 104 with a social networking system 106 (also referred to as "social network servers" herein) via a network 108. While a single user 102 and a single computing device 104 are depicted for clarity, the system 100 may include any number of users and/or computing devices that may implement the described techniques. The system 100 may further include business server(s) 110 associated with a third-party business which may communicate with the user 102 using a messaging service of the social networking system 106 via the network 108. In some examples, the user 102 may use the computing device 104 to submit Personal Identifiable Information ("PII") securely and directly to the business server(s) 110.

As used herein, "direct" or "directly" means a socket is created between the computing device 104 and the business server(s) 110 to transfer data (e.g., PII or other information input by the user 102). Thus, there is no intermediate communication via the social networking system 106, such that the data does not reach the backend servers of the social networking system 106.

As used herein, "secure" or "securely" means the data is encrypted by a transfer protocol (e.g., HTTPS/TLS or the like). By encrypting the data, attackers may be prevented from accessing the PII of the user 102 included in the data transferred throughout the system 100.

The computing device 104 includes one or more processors and memory storing computer executable instructions to implement the functionality discussed herein attributable to the various computing devices. In some examples, the computing device 104 may include one or more desktop computers, laptop computers, tablet computers, mobile devices (e.g., smart phones or other cellular or mobile phones, mobile gaming devices, portable media devices, etc.), or other suitable computing devices. The computing device 104 may execute an application 120. As used herein, "application" 120 may refer to any application that enables communication between users (e.g., sender and recipient of a message) of a digital platform (e.g., social networking system 106) over a wired or wireless communications network, such as the network 108. In some examples, the application 120 may comprise a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and communicate content over the network 108 or via the secure connection.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing device 104 may access the social networking system 106 and/or communicate with the business server(s) 110.

The business server(s) 110 may include one or more servers or other computing devices, any or all of which may include one or more processors and memory storing computer executable instructions to implement the functionality discussed herein. The business server(s) 110 may communicate with the user 102 via a messaging service associated with social networking system 106. As used herein, "business server(s)," "third-party businesses," and "third-party server" may be used interchangeably, and may represent a server associated with a business that is not controlled by the social networking system 106.

In some examples, the business server(s) 110 may include a token verification module 126 and/or an input verification module 128. The token verification module 126 may verify that communication received from the application 120 (e.g., via a secure connection) corresponds to an initial request sent to the computing device 104 via the social networking system 106 by the business server(s) 110 to obtain information from the user 102. In some examples, the token verification module 126 may perform one or more additional security checks, such as verifying a signature included in a packet header of the communication from the application 120 and/or verifying that the communication is from a list of whitelisted sources. The input verification module 128 may enable the business server(s) 110 to verify the PII provided by the user 102. In some examples, the input verification module 128 may communicate with one or more databases of the third-party business, and compare information stored in the one or more databases that corresponds to the user 102 with the PII provided by the user 102.

The social networking system 106 may include one or more servers or other computing devices, any or all of which may include one or more processors and memory storing computer executable instructions to implement the functionality discussed herein attributable to the digital platform associated with the social networking system 106. The social networking system 106 may enable the user 102 to interact with the social networking system 106 and with the business server(s) 110 of the third-party businesses via the application 120 on the computing device 104. The social networking system 106 may, with input from the user 102, create and store in the social networking system 106 a user account associated with the user 102. The user account may include demographic information, communication-channel information, information on personal interests of the user 102, and so forth.

In some examples, the social networking system 106 may include a template module 122. As an example and not by way of limitation, the template module 122 may parse a request from the business server(s) 110 to determine what type or types of information are included in the request. As discussed above, the request from the business server(s) 110 may include an indication of one or more types of information that the third-party business would like to obtain from the user 102, which may correspond to a pre-defined template and/or may be customized by the third-party business. For example, the template module 122 may generate a template that includes the one or more types of information included in the request from the business server(s) 110. In some examples, the template may be presented to the user 102 as a form with one or more areas to provide user input.

The template module 122 may also parse the request from the business server(s) 110 to determine an identifier of the user 102. The identifier may include any means of identifying the user 102 and/or the computing device 104 of a particular user, such that the social networking system 106 can determine which user account to send the request to. For example, the identifier may include a device identifier of the user's computing device 104. In this example, the social networking system 106 can use the identifier to generate the template corresponding to the request. In some examples, the social networking system 106 may generate the template corresponding to the request to enable the template to be rendered based on an operating system of the computing device 104. For example, the computing device 104 of the user 102 may have a particular operating system (e.g., Android, iOS, or the like), where the social networking system 106 may be configured to generate the template to be rendered based on the particular type of operating system. Additionally or alternatively, the application 120 may render user interfaces based on code written natively for the application 120 (e.g., Java on Android, or the like) and/or code written in a web frontend language (e.g., JavaScript or its extensions, or the like). In some examples, the template module 122 may generate the template based on the operating system of the computing device 104 and/or the application 120, such that the computing device 104 is enabled to render the template.

As described above, the social networking system 106 may additionally or alternatively include the token module 124. The token module 124 may generate a token that enables the business server(s) 110 to verify that a communication received from the application 120 is valid. In some examples, the token may include a signature token and may also include a time stamp. In some examples, the token may be unique to the specific combination of third-party business and the user 102. For example, a first token that is generated for a third-party business and a user at a first time will be different than a second token that is generated for the third-party business (e.g., the same third-party business) and the user (e.g., the same user) at a second time (e.g., a different time than the first time). The social networking system 106 may encrypt the token, such as by using a hash function, such as a Secure Hash Algorithm ("SHA") (e.g., SHA-256 or the like).

The social networking system 106 may also facilitate secure and direct communication between the user 102 and business server(s) 110 of the third-party business.

For example, at operation 112 (indicated by "1"), the business server(s) 110 of the third-party business may send, to the social networking system 106, via a network 108, a request to securely collect information from the user 102. In some examples, the business server(s) 110 may call one or more Application Programming Interfaces ("API") of the social networking system 106 as part of sending the request. The request may include an indication of one or more types of information that the third-party business wants to receive from the user 102 and an identifier of the user 102. In some examples, the identifier may include an indication (e.g., user account identifier, an identifier of the computing device 104, etc.) of who the third-party business is sending the request to. In some examples, the one or more types of information included in the request may comprise social security number, home address, date of birth, or the like. Additional or alternative types of information can be included in the request.

In some examples, one or more of the types of information requested can be associated with pre-defined formats (e.g., formats defined by the social networking system 106), such as name, home address, date of birth, social security number, payment information, or the like. Additionally or alternatively, the third-party business may customize one or more of the types of information included in the request. As an example and not by way of limitation, the request may indicate that the third-party business wants to collect customized information (e.g., one or more security questions, free form text messages, biometric data, or the like) from the user 102. In some examples, the request may be encrypted by the business server(s) 110 before being sent to the social networking system 106, such as by a transfer protocol. For example, the transfer protocol may be HTTPS/TLS, such that even if an attacker intercepts a data packet that includes the request, they will not be able to get useful (e.g., PII) information from the data packet.

In some examples, an operation 114 (indicated by "2") includes the social networking system 106 sending (e.g., pushing) the request to the application 120 on the computing device 104 of the user 102. For instance, the social networking system 106 may send the request as a data packet, where a token is included in a header of the data packet. In some examples, the social networking system 106 sends the token and a first instruction to the application 120 on the computing device 104, such that the first instruction causes the application 120 to present the request with a representation of a content item. In some examples, the representation of the content item may be a selectable item that is linked to the template and initiates direct and secure communication between the business server(s) 110 and the computing device 104.

In some examples, the application 120 of the computing device 104 may receive the request from the third-party business. The user 102 may select (e.g., tap) the representation of the content item to initiate the secure and direct communication and input PII (and/or other information) corresponding to the one or more types of information included in the template, and submit the PII to the business server(s) 110. For example, after entering the PII, the user 102 may select a button displayed in the template, such as "submit."

In some examples, an operation 116 (indicated by "3") includes the business server(s) 110 receiving the PII from the application 120 on the computing device 104. For instance, the computing device 104 may send the PII over a direct and secure connection to the business server(s) 110, such that the PII of the user 102 is not routed through servers of the social networking system 106. As discussed above, the direct and secure connection between the computing device 104 and the business server(s) 110 may be a socket between the computing device 104 (or application 120) and the business server(s) 110 to transfer data (e.g., PII or other information input by the user 102). In other words, there may be no intermediate from the social networking system 106, such that the data does not reach the backend servers of the social networking system 106 when the computing device 104 transfers the data to the business server(s) 110. In some cases, the communications between the application 120 and the business server(s) 110 may utilize end-to-end encryption (E2EE) techniques to prevent other intermediaries (e.g., a telecom provider, internet provider, or the like) from accessing content included in the communications.

In some examples, the business server(s) 110 may initially verify that the communication received from the application 120 corresponds to the initial request by the business server(s) 110, e.g., by verifying the token included in the header of the data packet in the initial request. Based at least in part on verifying the token to ensure that the data communication corresponds to the initial request, the business server(s) 110 may then verify the PII provided by the user 102. For instance, the business server(s) 110 may access one or more databases associated with the third-party business and compare the PII with user data from the database that is associated with the user 102. In some examples, the business server(s) 110 may perform one or more additional security checks, such as verifying a signature included in a packet header of the communication from the application 120 and/or verifying that the communication is from a list of whitelisted sources.

In some examples, both the business server(s) 110 and the computing device 104 may have a secure transfer protocol setup. For example, both the business server(s) 110 and the computing device 104 of the user 102 may have HTTPS/TLS and some shared encryption certificate.

Further, in some examples, an operation 118 (indicated by "4") may include the business server(s) 110 sending a second instruction to the application 120 on the computing device 104 of the user 102, to present a notification corresponding to the PII. For instance, the business server(s) 110 may determine that all required fields of the template have been completed by the user 102, and/or that the information entered into the fields of the template match information corresponding to the user 102 stored by the business server(s) 110. Based on such a determination, the business server(s) 110 may generate the second instruction to include an indication that the user data is verified. Alternatively or additionally, the business server(s) 110 may determine that not all of the required fields of the template have been completed by the user 102, that there are one or more errors associated with the user data, and/or that the information entered into the fields of the template do not match information corresponding to the user 102 stored by the business server(s) 110. Based on this determination, the business server(s) 110 may generate the second instruction to include an indication that the user data is incomplete or has not been verified.

As an example and not by way of limitation, the notification may include a banner indicating there was an error and/or a description of what that error is (e.g., incorrect PII, transportation error, etc.). Additionally or alternatively, where there is an error in the PII, the indication may include presenting a visual marker corresponding to one or more entries that failed to be verified.

In some examples, the operation 118 may not involve the social networking system 106. As an example and not by way of limitation, the business server(s) 110 may determine one or more errors occurred during verification of the PII of the user 102. In this example, the business server(s) 110 may send the second instruction directly to the application 120, such that the communication in operation 118 may not be passed to the social networking system 106.

In other examples, the operation 118 may involve the social networking system 106. As an example and not by way of limitation, the business server(s) 110 may determine that one or more errors occurred during verification of the PII and, in operation 118, send a second instruction to the social networking system 106 regarding the error. In some examples, the second instruction may cause the social networking system 106 to output a notification to the application 120. In some examples the social networking system 106 may push a notification describing the one or more errors to the application 120 for presentation by the computing device 104. For example, the social networking system 106 may cause the application 120 to present a notification indicating that the PII input by the user 102 failed to be verified.

For instance, the notification may additionally or alternatively include an indication of one or more errors corresponding to the verification. As an example and not by way of limitation, the notification may include a banner indicating there was an error and/or a description of what that error is (e.g., incorrect PII, transportation error, etc.). Additionally or alternatively, where there is an error in the PII, the indication may include presenting a visual marker corresponding to one or more entries that failed to be verified. In some examples, the business server(s) 110 may send a second instruction to the social networking system 106 indicating that the PII of the user 102 was successfully verified. For instance, the second instruction may cause the application 120 to present a notification indicating that the PII input by the user 102 was successfully verified.

Although the system 100 described above generally relates to one business entity corresponding to the business server(s) 110 of the third-party business, examples are also considered in which multiple business entities may perform one or more of the described operations (although not explicitly pictured). For example, one or more servers associated with a first business entity may be responsible for sending the request to collect user information, as described in relation to the operation 112. Continuing with this example, one or more servers of a second business entity may be responsible for receiving the data packet with user data and the token, as described in relation to the operation 116. For instance, the token verification module 126 and the input verification module 128 may be part of the one or more servers of the second business entity, and may send the second instruction based on the received data as described in relation to the operation 118. In some cases, the one or more servers of the first business entity may communicate with the one or more servers of the second business entity regarding token verification, input verification, and the like, as desired and/or arranged between the two business entities.

The modules and/or components may be utilized by a computing device of a social networking system (e.g., social networking system 106), the outputs of which may be used to control transmission of content to one or more user computing devices (e.g., the computing device 104) for communication with the business server(s) 110. As discussed above, modules and/or components described in this section may, but need not, be implemented in the context of the system 100.

In some examples, the social networking system 106 may provide privacy features to the user(s) 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102 may share an object to the social networking system 106. The object may be associated with a concept node connected to a user node of the user 102 by an edge. The user 102 may specify privacy settings that apply to a particular edge connecting to the concept node of the object, or may specify privacy settings that apply to all edges connecting to the concept node. In some examples, the user 102 may share a set of objects of a particular object-type (e.g., a set of images). The user 102 may specify privacy settings with respect to all objects associated with the user 102 of that particular object-type as having a particular privacy setting (e.g., specifying that all images posted by the user 102 are visible only to friends of the user and/or users tagged in the images).

In particular examples, the social networking system 106 may present a "privacy wizard" (e.g., within a webpage, a module, one or more dialog boxes, or any other suitable interface) to the user 102 to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102 that may display, to the user 102, current privacy settings of the user 102. The dashboard functionality may be displayed to the user 102 at any appropriate time (e.g., following an input from the user 102 summoning the dashboard functionality, following the occurrence of a particular event or trigger action). The dashboard functionality may allow the user 102 to modify one or more of the user's current privacy settings at any time, in any suitable manner (e.g., redirecting the user 102 to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102 (or other entity) for a particular object stored in a data store, the social networking system 106 may send a request to the data store for the object. The request may identify the user 102 associated with the request and the object may be sent only to the user 102 (or a client system of the user) if the authorization server determines that the user 102 is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102 may view one or more other users of an online social network through a "People You May Know" function of the online social network, or by viewing a list of friends of the user 102. As an example and not by way of limitation, the user 102 may specify that they do not wish to see objects associated with a particular other user in their newsfeed or friends list. If the privacy settings for the object do not allow it to be surfaced to, discovered by, or visible to the user 102, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102 may specify that the user's status updates are public, but any images shared by the user are visible only to the user's friends on the online social network. In some examples, the user 102 may specify different privacy settings for different types of entities, such as individual users, friends-of-friends, followers, user groups, or corporate entities. In some examples, the user 102 may specify a group of users that may view videos posted by the user 102, while keeping the videos from being visible to the user's employer. In particular examples, different privacy settings may be provided for different user groups or user demographics. As an example and not by way of limitation, the user 102 may specify that other users who attend the same university as the user 102 may view the user's pictures, but that other users who are family members of the user 102 may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102 may have a default privacy setting of being visible only to friends of the first user and, for a particular image, the user 102 may change the privacy setting for the image to be visible to friends and friends-of-friends.

In particular examples, privacy settings may allow the user 102 to specify (e.g., by opting out, by not opting in) whether the social networking system 106 may receive, collect, log, or store particular objects or information associated with the user 102 for any purpose. In particular examples, privacy settings may allow the user 102 to specify whether particular applications or processes may access, store, or use particular objects or information associated with the user. The privacy settings may allow the user 102 to opt in or opt out of having objects or information accessed, stored, or used by specific applications or processes. The social networking system 106 may access such information in order to provide a particular function or service to the user 102, without the social networking system 106 having access to that information for any other purposes. Before accessing, storing, or using such objects or information, the social networking system 106 may prompt the user 102 to provide privacy settings specifying which applications or processes, if any, may access, store, or use the object or information prior to allowing any such action. As an example and not by way of limitation, the user 102 may transmit a message to another user via an application related to the online social network (e.g., a messaging app), and may specify privacy settings that such messages should not be stored by the social networking system 106.

In particular examples, the user 102 may specify whether particular types of objects or information associated with the user 102 may be accessed, stored, or used by the social networking system 106. As an example and not by way of limitation, the user 102 may specify that images sent by the user 102 through the social networking system 106 may not be stored by the social networking system 106. In some examples, the user 102 may specify that messages sent from the user 102 to another user 102(2) may not be stored by the social networking system 106. In some cases, the user 102 may specify that all objects sent via a particular application may be saved by the social networking system 106.

In particular examples, privacy settings may allow the user 102 to specify whether particular objects or information associated with the user 102 may be accessed from particular client systems or third-party systems. The privacy settings may allow the user 102 to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102 may be prompted to specify a particular privacy setting for each context. As an example and not by way of limitation, the user 102 may utilize a location-services feature of the social networking system 106 to provide recommendations for restaurants or other places in proximity to the user 102. The default privacy settings of the user 102 may specify that the social networking system 106 may use location information provided from the computing device 104 of the user 102 to provide the location-based services, but that the social networking system 106 may not store the location information of the user 102 or provide it to any third-party system. The user 102 may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102 may transmit a message to another user, and the social networking system 106 may temporarily store the message in a data store until the other user has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102 may share a first image and specify that the first image is to be public to all other users. At a later time, the user 102 may specify that any images shared by the user 102 should be made visible only to a first user group. The social networking system 106 may determine that this privacy setting also applies to the first image and make the first image visible only to the first user group. In particular examples, the change in privacy settings may take effect only going forward. Continuing the example above, if the user 102 changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102 may want to change one or more privacy settings in response to a trigger action associated with the user 102. The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102 to change the privacy settings regarding the visibility of objects associated with the user 102. The prompt may redirect the user 102 to a workflow process for editing privacy settings with respect to one or more entities associated with the trigger action. The privacy settings associated with the user 102 may be changed only in response to an explicit input from the user 102, and may not be changed without the approval of the user 102. As an example and not by way of limitation, the workflow process may include providing the user 102 with the current privacy settings with respect to another user or to a group of users (e.g., un-tagging the user 102 or another user from particular objects, changing the visibility of particular objects with respect to the other user or a group of users), and receiving an indication from the user 102 to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings.

In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Examples User Interfaces

FIGS. 2A-3C are schematic views showing example user interfaces that are usable to implement the techniques described herein for enabling secure and direct communication of Personal Identifiable Information ("PII") provided by a user. The interfaces and/or the notifications may be based on one or more templates generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system. As discussed above, the interfaces described in this section may, but need not, be implemented in the context of the system 100.

As used herein, unless otherwise indicated, the term "select" or "selection" means a touch, a force touch, a multi-touch, a swipe in any direction, a voice input, a mouse input, a stylus input, or any other input designed to interact with a user interface control.

FIGS. 2A-2C illustrate example user interfaces that are usable to implement the techniques described herein for a business server(s) to request PII from a user and enabling a secure and direct communication of PII provided by a user.

A first user interface 200a shown in FIG. 2A corresponds to an example interface of the application 120 on a computing device (e.g., computing device 104) associated with the user 102.

The first user interface 200a includes a conversation 202 between the user 102 and Business-A 212 (e.g., a third-party business). In some examples, the conversation 202 is conducted using the application 120 on the computing device 104. In some examples, the application 120 may be a messaging application associated with the social networking system 106. In some cases, the conversation 202 may be conducted via a messaging service of a digital platform associated with the social networking system 106, which is accessed using application 120.

In some examples, the user 102 receives a message 204 indicating that Business-A 212 needs to verify information. The message 204 may be fully customized by Business-A 212. In some examples, the message 204 corresponds to the business server(s) 110 of the third-party business sending a request for information as described above in relation to the system 100. As discussed above, the request may comprise calling, by the business server(s) 110, an API of the social networking system 106.

The request may include an indication of one or more types of information and an identifier of a particular user. The identifier may include an indication of who the third-party business is sending the request to. For example, the request may include an identifier indicating a computing device (e.g., computing device 104) and/or a user account associated with the particular user. In some examples, the one or more types of information may include social security number, home address, date of birth, or the like. In some examples, one or more of the types of information requested can be associated with pre-defined formats (e.g., formats defined by the social networking server 106), such as name, home address, date of birth, social security number, payment information, or the like. Additionally or alternatively, one or more of the types of information requested can be customized and specific to the third-party business. For example, the request may indicate that the third-party business wants to collect customized information (e.g., one or more security questions, free form text messages, biometric data, or the like) from the user. In some examples, the request may be encrypted by the business server(s) 110 before being sent to the social networking system 106, such as by a transfer protocol, as described above.

In some examples, the social networking system 106 may send a notice 206, indicating that the information provided by the user 102 will be secure, and will not be accessible by the business server(s) 110 and/or the application 120.

Further, the social networking system 106 may send an instruction to the application 120 on the computing device 104 to present a request 208. In some examples, the request 208 includes a representation of a content item 210 that is selectable by the user 102 to initiate secure and direct communication with the Business-A 212. As an example and not by way of limitation, a third-party business (e.g., "Business-A" 212), may need to verify the identity of user 102. For instance, the third-party business may send, from the business server(s) 110, the request to the social networking system 106, which causes the message 204 to be displayed to the user 102 via the application 120. The social networking system 106 may display the message 206 independent of the request 208. Additionally, social networking system 106 may generate a template and send the request 208 and a representation of the content item 210 (e.g., "Begin Survey" button), which is selectable by the user 102 to open the template, thereby initiating direct and secure communication between the computing device 104 and the business server(s) 110 of the third-party business.

A second user interface 200b shown in FIG. 2B may be displayed based on the user 102 selecting the representation of the content item 210.

In some examples, the second user interface 200b may include content 214 determined by the social networking system 106 to notify the user 102 of the secure connection being established between the computing device 104 and the business server(s) 110. In some examples, the content 214 may include one or more of an image, text, or other media content. The user interface 200b may further include an Exit control 220, that is selectable by the user 102 to return the user to the first user interface 200a of FIG. 2A. In some examples, selection of the Exit control 220 terminates the secure and direct communication with the Business-A 212, such that communications using application 120 are once again routed through backend servers of the social networking system 106. In some examples, the second user interface 200b may also include a Linked control 216 (in this case, denoted by "Learn More") that is usable to provide the user 102 with additional information about the secure connection, encryption, and/or privacy.

In some examples, the second user interface 200b includes selectable control 218, that, when selected, enables the computing device 104 to render the template described in relation to FIG. 1. For instance, the user 102 may select the selectable control 218 by way of touch input. As a result of the user selecting the selectable control 218, the computing device 104 may display a third user interface 200c of FIG. 2C.

In some examples, the third user interface 200c displays content 222, which may include a profile corresponding to the third-party business, image(s), text, and/or other media content. In some examples, the content 222 includes text indicating the Business-A 212 is the recipient of the information input by the user 102. In some examples, the third user interface 200c may also include the Linked control 216 (in this case, denoted by "Learn More") discussed above with regard to the second user interface 200b.

In some examples, the third user interface 200c may include one or more fields 224a-224c, which may enable the user 102 to input information. The one or more fields 224a-224c correspond to the one or more types of information included in the request from the business server(s) 110 of Business-A 212. In some examples the one or more fields 224a-224c are rendered based on a pre-defined template and/or types of information customized by the business server(s) 110.

As discussed above, the information input by the user 102 in the one or more fields 224a-224c may not be accessible by the social networking system 106, such that the information input by the user 102 cannot be accessed and/or stored by the social networking system 106.

The third user interface 200c may also include the Exit control 220, that may be selectable by the user 102 to return to the first user interface 200a of FIG. 2A. In some examples, selection of the Exit control 220 terminates the secure and direct communication with the Business-A 212. For instance, the PII input is not written (e.g., stored) to local storage of the computing device 104. Further, communications made subsequent to the selection of the Exit control 220 and via the application 120 may once again be routed through the backend servers of the social networking system 106.

In some examples, the user interface 200c includes a control 226, which is selectable by the user 102 to render a first user interface 300a of FIG. 3A discussed below. In some examples, the control 226 may provide the same and/or similar functionality as the Submit control 308 of FIG. 3B, discussed in greater detail below.

FIGS. 3A-3C illustrate exemplary user interfaces of a user 102 submitting information to business server(s) of a third-party business via direct and secure connection, and a subsequent response from the business server(s) 110, in accordance with some embodiments of the present disclosure.

The first user interface 300a, shown in FIG. 3A, corresponds to a user 102 submitting user information (e.g., PII) to the business server(s) 110 of a third-party business. In some examples, the first user interface 300a may be presented additionally or alternatively to the third user interface 200c of FIG. 2C discussed above. In some examples, the first user interface 300a may include one or more fields 302a-302d for inputting information. The one or more fields 302a-302d may correspond to the one or more types of information included in the request from the business server(s) 110. In some examples, the one or more fields 302a-302d are rendered based on a pre-defined template and/or types of information customized by the third-party business. As discussed above, the information input by the user in the one or more fields 302a-302d (e.g., the user's PII) is not accessible by the social networking system 106, such that the user's PII may not be accessed and/or stored by the social networking system 106.

The first user interface 300a may also include the Exit control 220, that is selectable by the user 102 to return to the first user interface 200a of FIG. 2A. In some examples, selection of the Exit control 220 terminates the secure and direct communication with the Business-A 212. For instance, the PII input by the user 102 is not written to local storage of the computing device 104. Further, communications made subsequent to the selection of the Exit control 220 and via the application 120 may once again be routed through the backend servers of the social networking system 106.

The first user interface 300a may further include a text element 304, which provides information regarding the Linked element 306 (in this case, denoted by "Learn More"). In some examples, the message of the text element 304 (e.g., "For more information about Business-A's privacy policy") is determined by the social networking system 106. In some examples, the message of the Linked element 306 is provided by the business server(s) 110. For instance, the Linked element 306 may correspond to a hyperlink to a web page of the Business-A 212 that includes information about the third-party business's privacy policy.

The first user interface 300a may also include a Submit control 308 (in this case, denoted by "Submit"), that is selectable by the user 102 to send information provided in at least the one or more fields 302a-302d (e.g., PII of the user 102), to the business server(s) 110. In some examples, selecting the Submit control 308 may cause information entered in the one or more fields 224a-224c of FIG. 2C discussed above and/or information entered in the one or more fields 302-302d to be sent directly and securely to the business server(s) 110, e.g., without passing through the social networking system 106. In some examples, user selection of the Submit control 308 causes the application 120 to send a data packet to the business server(s) 110. For instance, the data packet may include a token in a packet header. The data packet may further include the information entered into to the one or more fields 302a-302d (and/or 224a-224c of FIG. 2C). Further, as discussed above, the data packet may be encrypted, such as by a transfer protocol.

Upon receiving the communication (e.g., the data packet) from the application 120, the business server(s) 110 may verify the token in order to verify the communication is coming from a valid user. If the verification is successful, the business server(s) 110 may also verify the user information (e.g., PII) submitted by the user 102. In some examples, verification of the user information may include accessing, by the business server(s) 110, one or more databases of the third-party business, and comparing information stored in the one or more databases that is associated with the user 102 to the user information received in the data packet.

Accordingly, the business server(s) 110 may respond to the application 120 with a second instruction to present a notification corresponding to the user information submitted by the user 102. For example, a second user interface 300b, shown in FIG. 3B, may correspond to a user interface displayed in response to the computing device 104 receiving the second instruction. In some examples, the second instruction may cause the application 120 to present an indication that the business server(s) 110 failed to verify the information submitted in the one or more fields 302a-302d (and/or 224a-224c of FIG. 2C).

In some examples, the second user interface 300b may include the same and/or similar elements as the first user interface 300a. Additionally, the second user interface 300b may include a notification 310 corresponding to an error associated with verifying the user information. In some examples, the notification 310 may correspond to failure by the business server(s) 110 to verify the user information. For instance, in some examples, the business server(s) 110 may determine that the user information does not match the information corresponding to a user account of the user 102. In some examples, the notification 310 may correspond to one or more errors, such as a transport error by the network 108. Additionally or alternatively, the second user interface 300b may include visual indicator(s) 314 corresponding to the notification 310. For instance, where the notification 310 corresponds to an input error by the user 102, the second user interface 300b may include the visual indicator(s) 314 showing which input was incorrect. The visual indicator(s) 314 may include any indicator (e.g., image, symbol, color, changing in text, highlighting, or the like) to show where the input error occurred, which element was input incorrectly, and so forth.

In some examples, the notification 310 is generated by the social networking system 106 and pushed to the application 120 on the computing device 104. For instance, the second user interface 300b may include a Retry control 312 as part of the notification 310. The Retry control 312 may be selectable by the user 102, such that selection causes the third user interface 200c of FIG. 2C to be presented to allow the user 102 to provide correct information to the business server(s) 110. For example, user selection of the Retry control 312 may re-initiate secure and direct communication with the business server(s) 110. As discussed above, the information input by the user 102 into the one or more fields 302a-302d of FIG. 3A cannot be accessed and/or stored by the social networking system 106, such that the information input by the user 102 is not accessible and/or storable by the social networking system 106.

The second user interface 300b may also include the Exit control 220, that is selectable by the user 102 to return to the first user interface 200a of FIG. 2A. In some examples, selection of the Exit control 220 terminates the secure and direct communication between the user 102 and the business server(s) 110 of the Business-A 212. For instance, the information input into the one or more fields 302a-302d of FIG. 3A (and/or the one or more fields 224a-224c of FIG. 2C) is not written to local storage of the computing device 104. Further, as discussed above, communications made subsequent to the selection of the Exit control 220 and via the application 120 may be once again routed through the backend servers of the social networking system 106.

In some examples, the business server(s) 110 may successfully verify the user information submitted by the user 102. For example, a third user interface 300c, shown in FIG. 3C may correspond to a user interface displayed in response to the computing device 104 receiving the second instruction, and include a notification 318 of success in verifying the user information. In some examples, the notification 318 corresponds to the business server(s) 110 successfully verifying the user information submitted from one or more of the third user interface 200c of FIG. 2C, the first user interface 300a of FIG. 3A, and/or the second user interface 300b, described above.

In some examples, successful verification of the user information causes termination of the secure and direct communication between the user 102 and business server(s) 110. For example, the application 120 may display the third user interface 300c, which may continue the conversation 202 with the Business-A 212. For instance, the business server(s) 110 may send the second instruction to the social networking system 106 to cause the application 120 to present the notification 318. As such, the secure and direct communication (e.g., the socket) is terminated, such that the notification 318, as well as any subsequent messages in the conversation 202, are routed through the backend servers of the social networking system 106.

Example Methods

Various methods are described with reference to the example system 100 of FIG. 1 for convenience and ease of understanding. However, the methods described are not limited to being performed using the system 100 of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 4:
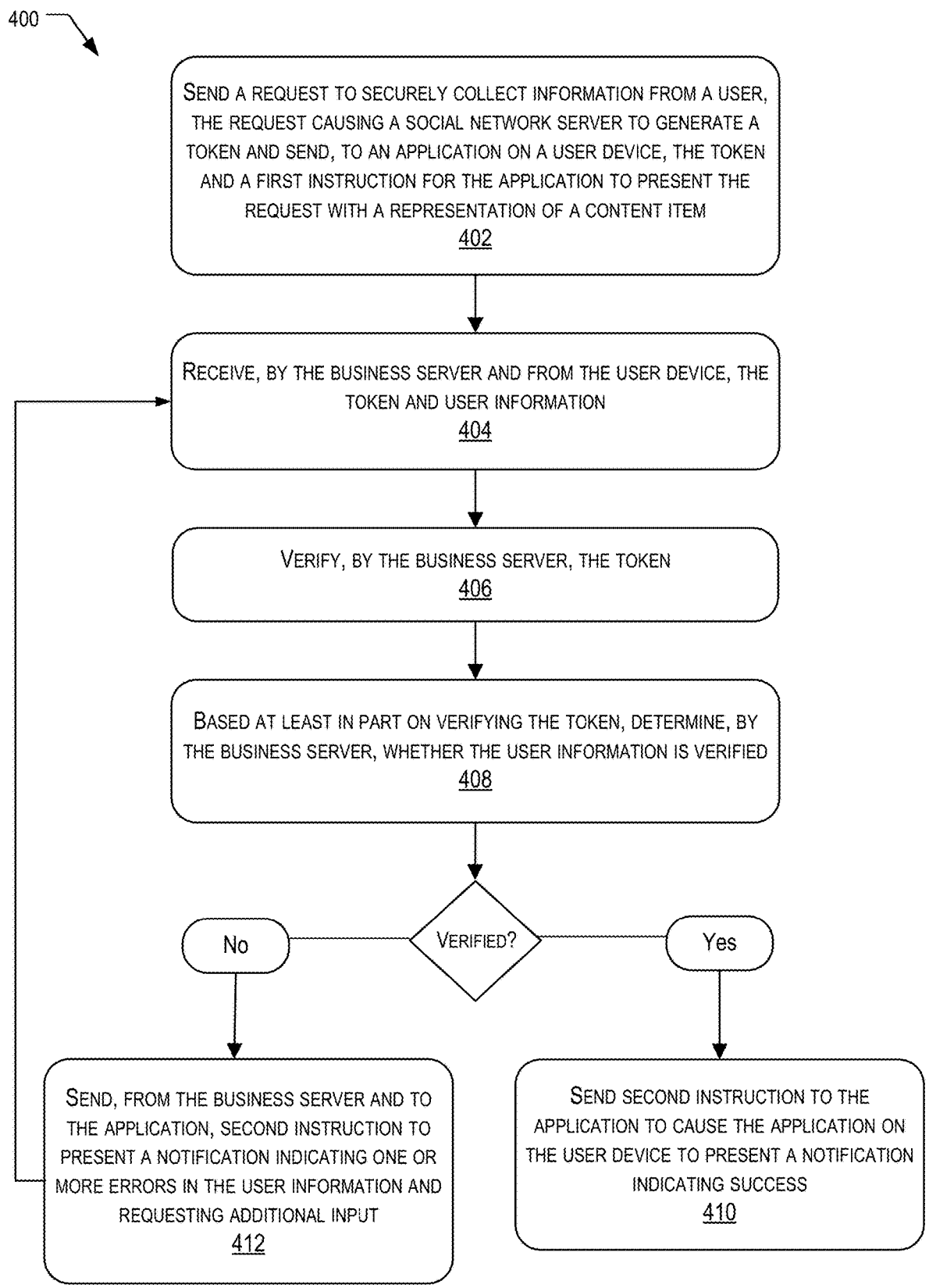
FIG. 4 illustrates an example process for facilitating secure and direct communication between a user and a third-party business in accordance with some embodiments of the present disclosure.

FIG. 4 illustrates an example process 400 for direct and secure communication of Personal Identifiable Information ("PII") between a user and a third-party business, with reference to embodiments described herein.

At operation 402, the process can include sending, from a business server and to a social network server, a request to securely collect information from a user, where the request causes the social network server to generate a token and send, to an application on a user device, the token and a first instruction for the application to present the request with a representation of a content item. As discussed above, the request may comprise calling, by the business server(s) 110, an API of the social networking system 106. The request may include an indication of one or more types of information and an identifier of a particular user who the third-party business is sending the request to. The one or more types of information may include social security number, home address, date of birth, or the like. In some examples, one or more of the types of information requested can be associated with pre-defined formats (e.g., formats defined by the social networking server), such as name, home address, date of birth, social security number, payment information, or the like. Additionally or alternatively, one or more of the types of information requested can be customized and specific to the third-party business. For example, the request may indicate that the third-party business wants to collect customized information (e.g., one or more security questions, free form text messages, biometric data, or the like) from the user. In some examples, the request may be encrypted by the business server(s) before being sent to the social networking system, such as by a transfer protocol. For example, the transfer protocol may be HTTPS/TLS, such that even attackers intercept the communication, they will not be able to get useful information (e.g., PII) from it.

At operation 404, the process can include receiving, by the business server and from the user device, the token and the user information. As discussed above, the business server(s) 110 may receive the user information via a secure and direct connection between the business server(s) 110 and the application 120 on the computing device 104. In some examples, the computing device 104 may create a socket between the computing device 104 and the business server(s) 110 to transfer data (e.g., PII or other information input by the user 102). For instance, there may be no intermediate on behalf of the social network system 106, such that the data does not reach the social networking system 106. Additionally, the data (e.g., user information and/or PII) may be encrypted by a transfer protocol (e.g., HTTPS/TLS or the like), as discussed above.

At operation 406, the process can include verifying, by the business server, the token. In some examples, the token verification module 126 of the business server(s) 110 may verify the token, as described above. In some examples, the business server(s) 110 may perform one or more additional security checks, such as verifying that the communication is from a list of whitelisted sources. In some examples, both the business server(s) 110 and the computing device 104 may have a secure transfer protocol setup, such as HTTPS/TLS and some shared encryption certificate.

Based at least in part on verifying the token, the process may proceed to operation 408, where the process can include determining, by the business server, whether the user information is verified. In some examples, the input verification module 128 may verify the PII provided by the user 102, as described above. In some examples, the business server(s) 110 may verify the PII by accessing one or more databases of the third-party business, and comparing information stored in the one or more databases that are associated with the user 102 with the PII provided by the user 102.

If the business server(s) 110 successfully verify the user information provided by the user 102, the process proceeds to operation 410. At operation 410, the process can include sending a second instruction to the application to cause the application on the user device to present a notification indicating success. If the business server(s) 110 at operation 408 do not successfully verify the user information provided by the user 102, the process proceeds to operation 412. At operation 412, the process can include sending, from the business server and to the application, a second instruction to present a notification indicating one or more errors in the user information and requesting additional input. For instance, the notification may include an indication of one or more errors corresponding to the verification. As an example and not by way of limitation, the notification may include a banner indicating there was an error and/or a description of what that error is (e.g., incorrect PII, transportation error, etc.). In some examples the user 102 may be allowed to re-enter the information that caused the error and/or re-send the user information (e.g., where the error is not caused by the user's input, such as a transport or network error).

In some examples, the business server(s) 110 may determine one or more errors occurred during verification of the PII of the user 102. For instance, the business server(s) 110 may send the second instruction directly to the application 120, such that the communication may not be passed to the social networking system 106. In some examples, the business server(s) 110 may determine that one or more errors occurred during verification of the PII and send a second instruction to the social networking system 106 to push an indication of the error to the application 120, as described in the discussion of FIG. 3B above.

Figure 5:
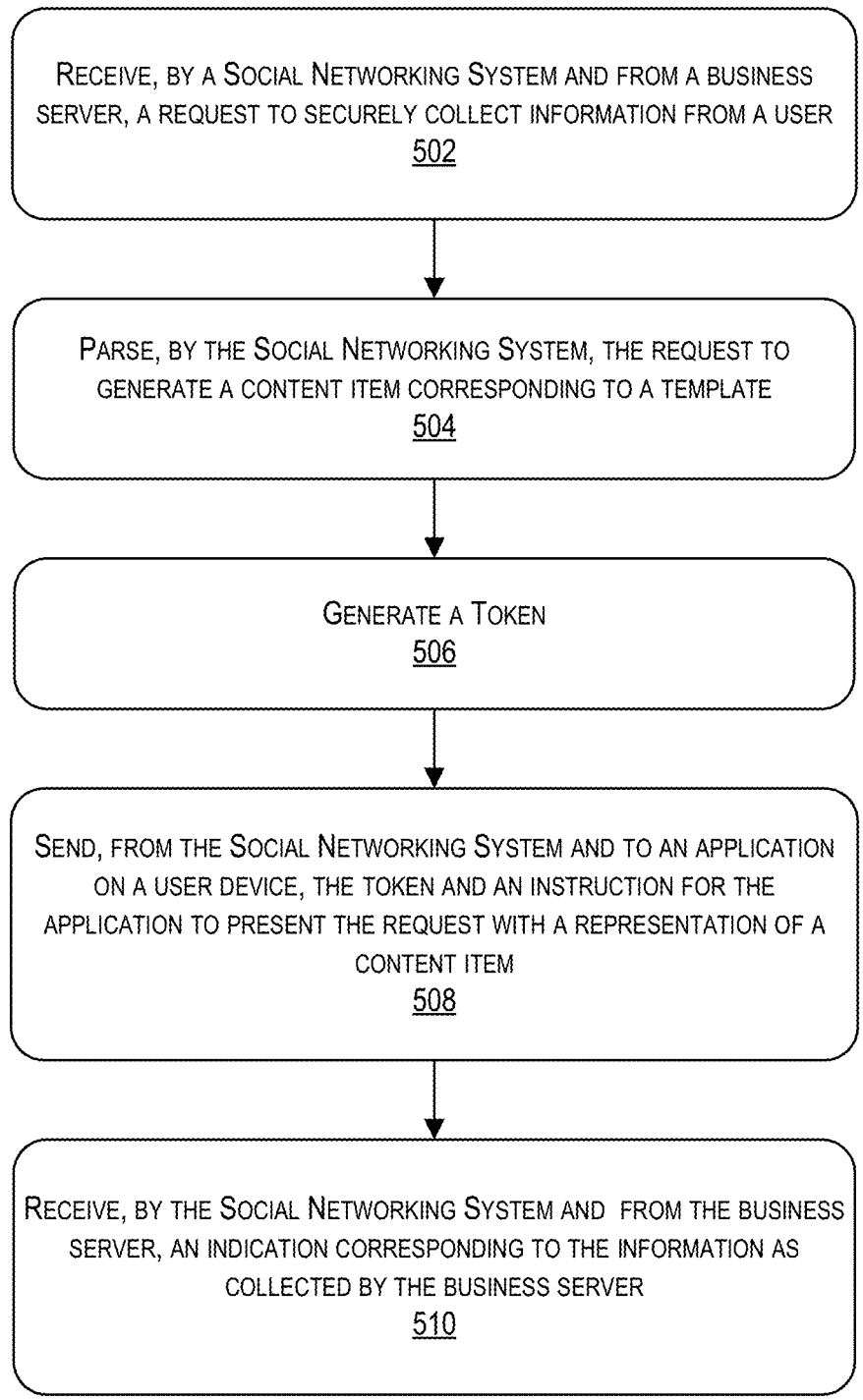
FIG. 5 illustrates an example process for facilitating secure and direct communication between users of a digital platform by a social networking system in accordance with some embodiments of the present disclosure.

FIG. 5 illustrates an example process 500 for facilitating secure and direct communication between users of a digital platform by a social networking system, in accordance with some embodiments of the present disclosure and with reference to system 100.

At operation 502, a social networking system may receive, from a business server, a request to securely collect information from a user. In some examples, the request may be encrypted by the business server(s) 110 before being sent to the social networking system 106, such as by a transfer protocol. For example, the transfer protocol may be HTTPS/TLS, such that even attackers intercept the communication, they may not be able to get useful information (e.g., PII) from it.

At operation 504, the social networking system may parse the request to generate a content item corresponding to a template. In some examples, the social networking system 106 may parse the request to determine the identity of the third-party business (e.g., who the request is coming from) and an identifier associated with the user 102 (e.g., who the request is being sent to). The social networking system 106 may also parse the request to determine type(s) of information that the third-party business is requesting from the user 102. In some examples, the one or more types of information may include social security number, home address, date of birth, or the like. In some examples, the social networking system 106 generates a template associated with the request. For instance, the template may include the one or more types of information to be collected from the user. In some examples, the template includes one or more of the types of information that are associated with pre-defined formats. For example, the pre-defined formats may correspond to formats defined by the social networking system 106, such as name, home address, date of birth, social security number, payment information, or the like. Additionally or alternatively, the social networking system 106 can generate the template to incorporate one or more of the types of information that are customized and specific to the third-party business (e.g., one or more security questions, free form text messages, biometric data, or the like).

At operation 506, the social networking system 106 generates a token. In some examples, the token may represent a signature token that can be used by the business server(s) 110 to verify that information submitted by a user 102 is valid. In some examples, the token may also include a time stamp corresponding to when the social networking system 106 generates the token. Additionally, in some cases, the token may be unique to the specific combination of the third-party business and the user 102. For example, a first token that the social networking system 106 generates for a third-party business and a user at a first time (e.g., with a first time stamp) will be different than a second token that the social networking system 106 generates for the third-party business (e.g., the same third-party business) and the user (e.g., the same user) at a second time (e.g., with a second, different time stamp). In some examples, the social networking system 106 may encrypt the token for sending, such as by using a hash function as described above.

At operation 508, the social networking system sends the token and an instruction for the application to present the request with a representation of a content item to an application on a user device. In some examples, the application 120 on the computing device 104 may be associated with a user account of the user 102 identified in the request. In some examples, the representation of the content item is linked to the template generated by the social networking system 106. For example, the representation of the content item may comprise a button or a link, as described above in the discussion of FIG. 2A.

At operation 510, the social networking system receives, from the business server, an indication corresponding to the information as collected by the business server. In some examples, the indication may comprise a second instruction to cause, by the social networking system 106, the application 120 to present a notification. For instance, the notification may correspond to an indication that the business server(s) 110 successfully verified the information collected from the user 102, as described above in the discussion of FIG. 3C. Alternatively or additionally, the notification may correspond to a failure to verify the information collected by the business server(s) 110. For instance, the second instruction may comprise pushing, by the social networking system 106, a notification to the application 120, as described above in the discussion of FIG. 3B.

Figure 6:
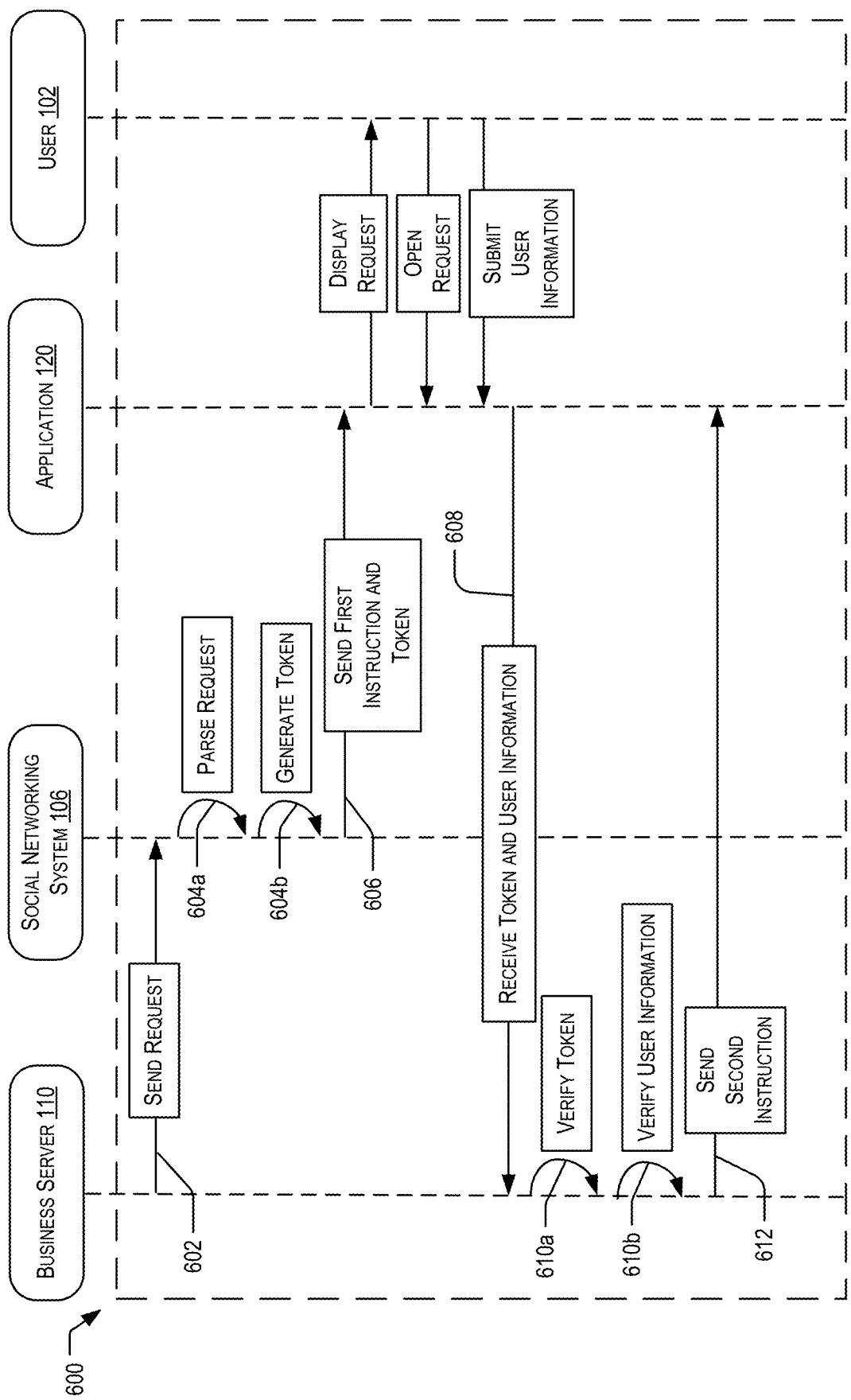
FIG. 6 depicts a process illustrating exemplary techniques for enabling secure and direct communication in accordance with some embodiments of the present disclosure.

FIG. 6 depicts a process 600 illustrating exemplary techniques for enabling secure and direct communication in accordance with some embodiments of the present disclosure, and with reference to system 100.

At operation 602, the process can include sending, from the business server(s) 110 of a third-party business, a request to the social networking system 106. As discussed above, the request may comprise calling, by the business server(s) 110, an API of the social networking system 106. The request may include an indication of one or more types of information and an identifier of a particular user. The one or more types of information may include social security number, home address, date of birth, or the like. In some examples, one or more of the types of information requested can be associated with pre-defined formats (e.g., formats defined by the social networking system 106), such as name, home address, date of birth, social security number, payment information, or the like. Additionally or alternatively, one or more of the types of information requested can be customized and specific to the third-party business. For example, the request may indicate that the third-party business wants to collect customized information (e.g., one or more security questions, free form text messages, biometric data, or the like) from the user 102. In some examples, business server(s) 110 may encrypt the request before sending the request to the social networking system 106, such as by a transfer protocol. For example, the transfer protocol may be HTTPS/TLS, as discussed above.

The process may also include operations 604a-604b, which correspond to processing done by the social networking system 106 in response to receiving the request in the operation 602. At operation 604a, the process can include parsing the request to determine one or more types of information requested by the business server(s) 110, and an identifier indicating an end user (e.g., user 102). At operation 604b, the process can include generating, by the social networking system 106, a token. In some examples, the social networking system 106 may encrypt the token, such as by using a hash function, such as a Secure Hash Algorithm ("SHA") (e.g., SHA-256 or the like).

At operation 606, the process can include sending, from the social networking system 106, a first instruction and the token (generated in operation 604b) to the application 120 computing device. In some examples, the first instruction may cause the application 120 to display a request to the user 120 for desired information, where the request may be formatted based on a template generated by the business server(s) 110. The user 102 may open the request, which in some cases, may cause the application 120 to initiate the secure and direct connection between the computing device 104 (not pictured) and the business server(s) 110. Additionally, the user 102 may submit user information (e.g., PII and/or other information) via the application 120 to be sent directly to the business server(s) 110 via the direct and secure connection.

At operation 608, the process can include receiving, by the business server(s) 110 and from the application 120, the token and the user information submitted by the user 102, via a secure and direct communication. As discussed above, a socket may be created between the application 120 and the business server(s) 110 to transfer data (e.g., PII or other information input by the user 102).

The process may include operations 610a-610b, which may be conducted at the business server(s) 110. At operation 610a, the process can include verifying the token. In some examples, the token verification module 126 may verify the token, as described above. In some examples, the business server(s) 110 may perform one or more additional security checks, such as verifying a signature included in a packet header of the communication from the application 120 and/or verifying that the communication is from a list of whitelisted sources.

Based on the token being successfully verified, the operation 610b, may include verifying the PII submitted by the user 102. In some examples, the business server(s) 110 may verify the PII provided by the user 102. For example, the input verification module may perform verification of the PII, as discussed above. In some examples, verification of the PII includes communicating with one or more databases of the third-party business to access information associated with the user 102. For instance, the verification may be based on the input verification module 128 comparing the information associated with the user 102 stored in one or more databases accessible by the business server(s) 110 with the PII provided by the user 102.

At operation 612, the process can include sending, from the business server(s) 110 and to the application 120, a second instruction via the secure and direct connection. In some examples, the second instruction may cause the application 120 to present a notification corresponding to the PII provided by the user 102.

In some examples, the second instruction may cause the application 120 to present a notification indicating that the PII input by the user 102 was successfully verified by the business server 110. Alternatively or additionally, the second instruction may cause the application 120 to present a notification indicating that the PII input by the user 102 failed to be verified by the business server(s) 110. For instance, the notification may include an indication of one or more errors corresponding to the verification. As an example and not by way of limitation, the notification may include a banner indicating there was an error and/or a description of what that error is (e.g., incorrect PII, transportation error, etc.). Additionally or alternatively, where there is an error in the user information itself, the indication may include presenting a visual marker corresponding to one or more entries that failed to be verified.

In some examples, the business server(s) 110 may determine that one or more errors occurred during verification of the PII of the user 102. For instance, the business server(s) 110 may send the second instruction directly to the application 120, such that the second instruction may not be passed through the social networking system 106. In some cases, the operation 612 may comprise sending the second instruction to the social networking system 106, as described in the discussions of FIGS. 3B and 3C above.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example System and Device

Figure 7:
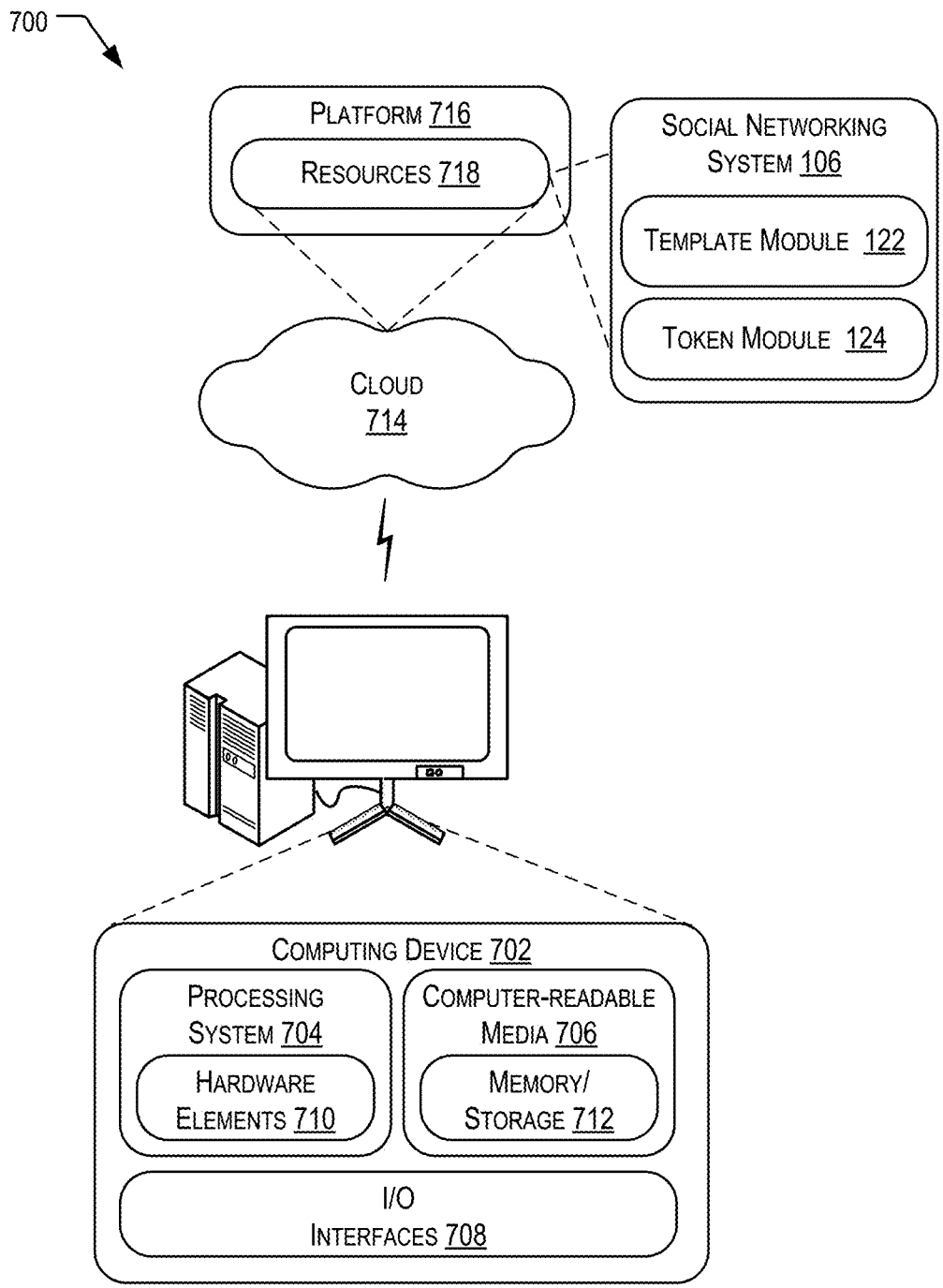
FIG. 7 illustrates an example system and device which may be used to implement the techniques described herein.

FIG. 7 illustrates an example system generally at 700 that includes an example computing device 702 that is representative of one or more computing systems and/or devices that may implement the various techniques described herein. This is illustrated through inclusion of the social networking system 106, the template module 122, and the token module 124. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device embodiment, implementation of functionality described herein may be distributed throughout multiple devices of the system 700. For example, the functionality may be implemented in part on the computing device 702 as well as via the platform 716 which may represent a cloud computing environment 714.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    sending, from a business server and to a social network server, a request to securely collect information from a user, the request causing the social network server to generate a token and send, to an application on a user device, the token and a first instruction for the application to present the request with a representation of a content item;
    receiving, by the business server and from the user device, the token and user information in response to the request;
    verifying, by the business server, the token;
    based at least in part on verifying the token, determining, by the business server, whether the user information is verified; and
    sending, from the business server and to the application on the user device, a second instruction to present a notification corresponding to the user information,
    wherein the representation of the content item presented in the application on the user device with the request is associated with a template comprising one or more information fields corresponding to one or more types of information to be collected from the user,
    wherein the template is configured to communicate the user information through a socket created directly between the user device and the business server and without intermediate communication via the social network server,
    wherein the template is further configured to communicate the user information encrypted by a transfer protocol,
    wherein the request is further configured to cause the social network server to generate the template, and
    wherein the one or more types of information included in the template are based at least in part on the request from the business server.

2. The method of claim 1, wherein the request from the business server comprises at least an identifier associated with the user and an indication of one or more types of information to be collected from the user.

3. The method of claim 1, wherein the request and the user information are encrypted by a transfer protocol.

4. The method of claim 1, wherein the application on the user device comprises at least one of a web browser, a web interface, or a desktop application, and wherein the template is hosted as a website with a domain corresponding to the social network server.

5. The method of claim 1, wherein the application on the user device comprises a messaging application associated with the social network server, and wherein the template is rendered locally on the user device.

6. The method of claim 1, wherein receiving the token and the user information by the business server prevents the user information from being stored locally by the user device or by the application on the user device.

7. The method of claim 1, wherein the determining, by the business server, whether the user information is verified is based at least in part on comparing the user information with user data stored in a database of the business server, the method further comprising:
    based at least in part on the user information being successfully verified, generating the second instruction to comprise an indication that the user information was verified; or
    based at least in part on the business server determining that the user information failed to be verified, generating the second instruction to indicate one or more errors corresponding to the user information and requesting additional input from the user.

8. A system comprising:
    one or more processors; and
    computer-readable media storing instructions that, when executed by the one or more processors, cause the system to:
    sending, from a business server and to a social network server, a request to securely collect information from a user, the request causing the social network server to generate a token and send, to an application on a user device of the user, the token and a first instruction for the application to present the request with a representation of a content item;
    receiving, by the business server and from the user device, the token and user information input by the user in response to the request;
    verifying, by the business server, the token;
    based at least in part on verifying the token, accessing, by the business server, the user information for verification by the business server; and
    sending, from the business server and to the application on the user device, a second instruction to present a notification corresponding to the user information,
    wherein the representation of the content item presented in the application on the user device with the request is associated with a template comprising one or more information fields corresponding to one or more types of information to be collected from the user,
    wherein the template is configured to communicate the user information through a socket created directly between the user device and the business server and without intermediate communication via the social network server,
    wherein the template is further configured to communicate the user information encrypted by a transfer protocol,
    wherein the request is further configured to cause the social network server to generate the template, and
    wherein the one or more types of information included in the template are based at least in part on the request from the business server.

9. The system of claim 8, wherein one or more of the request or the user information are encrypted by a transfer protocol.

10. The system of claim 8, wherein the request from the business server comprises at least an identifier associated with the user and an indication of one or more types of information to be collected from the user.

11. The system of claim 8, wherein the application on the user device comprises:
   a messaging application associated with the social network server, and wherein the template is rendered locally on the user device; or
   at least one of a web browser, a web interface, or a desktop application, and wherein the template is hosted as a website with a domain corresponding to the social network server.

12. The system of claim 8, wherein determining whether the user information is verified is based at least in part on comparing the user information with user data stored in a database of the business server, the system further comprising:
   based at least in part on the user information being successfully verified, generating the second instruction to comprise an indication that the user information was verified; or
   based at least in part on the business server determining that the user information failed to be verified, generating the second instruction to indicate one or more errors corresponding to the user information input and requesting additional input from the user.

13. One or more computer-readable media storing instructions that, when executed by one or more processors of a server computing device, cause the server computing device to perform operations comprising:
   sending, from a business server and to a social network server, a request to securely collect information from a user, the request causing the social network server to generate a token and send, to an application on a user device of the user, the token and a first instruction for the application to present the request with a representation of a content item;
   receiving, by the business server and from the user device, the token and user information input by the user in response to the request;
   verifying, by the business server, the token;
   based at least in part on verifying the token, accessing, by the business server, the user information for verification by the business server; and
   sending, from the business server and to the application on the user device, a second instruction to present a notification corresponding to the user information,
   wherein the representation of the content item presented in the application on the user device with the request is associated with a template comprising one or more information fields corresponding to one or more types of information to be collected from the user,
   wherein the template is configured to communicate the user information through a socket created directly between the user device and the business server and without intermediate communication via the social network server,
   wherein the template is further configured to communicate the user information encrypted by a transfer protocol,
   wherein the request is further configured to cause the social network server to generate the template, and
   wherein the social network server determines the one or more types of information based at least in part on the request from the business server.

14. The one or more computer-readable media of claim 13, wherein the request and the user information are encrypted by a transfer protocol.

15. The one or more computer-readable media of claim 13, wherein the request from the business server comprises at least an identifier associated with the user and an indication of one or more types of information to be collected from the user.

16. The one or more computer-readable media of claim 13, wherein the application on the user device comprises:
   a messaging application associated with the social network server, and wherein the template is rendered locally on the user device; or
   at least one of a web browser, a web interface, or a desktop application, and wherein the template is hosted a website with a domain corresponding to the social network server.

17. The one or more computer-readable media of claim 14, wherein determining whether the user information is verified is based at least in part on comparing the user information with user data stored in a database of the business server, the instructions further causing the server computing device to perform operations comprising:
   based at least in part on the user information being successfully verified, generating the second instruction to comprise an indication that the user information was verified; or
   based at least in part on the business server determining that the user information failed to be verified, generating the second instruction to indicate one or more errors corresponding to the user information input and requesting additional input from the user.

* * * * *